(12) United States Patent
Dao et al.

(10) Patent No.: US 8,995,592 B2
(45) Date of Patent: Mar. 31, 2015

(54) SIGNALING TO SUPPORT ADVANCED WIRELESS RECEIVERS AND RELATED DEVICES AND METHODS

(75) Inventors: Ngoc Dung Dao, Ottawa (CA); Aaron Callard, Ottawa (CA); Mohammadhadi Baligh, Kanata (CA); Hang Zhang, Nepean (CA); Ho Ting Cheng, Nepean (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/468,901

(22) Filed: May 10, 2012

(65) Prior Publication Data

US 2013/0301757 A1 Nov. 14, 2013

(51) Int. Cl.
| | |
|---|---|
| H04B 1/10 | (2006.01) |
| H04L 25/03 | (2006.01) |
| H04B 1/7105 | (2011.01) |
| H04L 1/00 | (2006.01) |
| H04L 27/06 | (2006.01) |
| H03D 1/04 | (2006.01) |

(52) U.S. Cl.
CPC ........ *H04L 25/03006* (2013.01); *H04B 1/7105* (2013.01); *H04L 1/0047* (2013.01); *H04L 25/03305* (2013.01)
USPC .......... 375/348; 375/346; 375/316; 455/63.1; 455/39

(58) Field of Classification Search
CPC ... H04L 1/0631; H04L 1/005; H04L 25/0228; H04L 25/02006; H04L 25/03305; H04B 1/7107; H04B 1/71072; H04B 1/1027; H04B 17/005; H04J 11/004; H04J 11/0056
USPC ..................... 375/346, 348, 316; 455/63.1, 39
See application file for complete search history.

(56) References Cited

U.S. PATENT DOCUMENTS

| | | | |
|---|---|---|---|
| 8,374,270 B2 * | 2/2013 | Tomezak et al. | 375/261 |
| 2008/0279317 A1 * | 11/2008 | Lee et al. | 375/346 |
| 2010/0027462 A1 * | 2/2010 | Lee et al. | 370/328 |
| 2010/0069010 A1 * | 3/2010 | Karakayali et al. | 455/63.1 |
| 2010/0173643 A1 * | 7/2010 | Beale et al. | 455/452.1 |
| 2010/0232553 A1 * | 9/2010 | Gomadam et al. | 375/346 |

(Continued)

FOREIGN PATENT DOCUMENTS

| | | |
|---|---|---|
| CN | 1806395 A | 7/2006 |
| CN | 101137233 A | 3/2008 |
| WO | WO 2004/105264 A2 | 12/2004 |

OTHER PUBLICATIONS

"Gaining Spectral Efficiency with OFDM," National Instruments, Sep. 9, 2008, p. 4.*

(Continued)

*Primary Examiner* — Chieh M Fan
*Assistant Examiner* — Michelle M Koeth (57) ABSTRACT

Various devices and methods are provided that use signaling to support advanced wireless receivers. For example, a method includes receiving an input signal at a user equipment. The input signal includes a desired signal and an interfering signal, where the desired signal defines symbols using constellations. The method also includes obtaining information identifying a wireless channel used by the interfering signal and a modulation type used to modulate data in the interfering signal. The method further includes recovering the symbols from the desired signal using the information.

18 Claims, 4 Drawing Sheets

(56) References Cited

U.S. PATENT DOCUMENTS

| | | | |
|---|---|---|---|
| 2010/0238981 A1* | 9/2010 | Nagarajan et al. | 375/148 |
| 2011/0250919 A1* | 10/2011 | Barbieri et al. | 455/509 |
| 2012/0057545 A1 | 3/2012 | Hariharan et al. | |
| 2012/0071104 A1 | 3/2012 | Onodera et al. | |
| 2012/0071153 A1* | 3/2012 | Balachandran et al. | 455/422.1 |
| 2012/0201162 A1* | 8/2012 | Kim et al. | 370/252 |

OTHER PUBLICATIONS

"ETSI TS 136 211 v8.5.0, LTE; Evolved Universal Terrestrial Radio Access (E-UTRA); Physical channels and modulation," 3GPP, 2009, pp. 21-33.*

* cited by examiner

SIGNALING TO SUPPORT ADVANCED WIRELESS RECEIVERS AND RELATED DEVICES AND METHODS

TECHNICAL FIELD

This disclosure relates generally to communication systems. More specifically, this disclosure relates to signaling to support advanced wireless receivers and related devices and methods.

BACKGROUND

Interference has long been a problem in wireless communication systems. Even modern communication systems, such as Third Generation Partnership Project (3GPP) Long Term Evolution (LTE) compliant communication systems, are not immune from interference. Traditionally, advanced receivers using Interference Rejection Combining (IRC) were among the best receivers for combating interference. IRC receivers calculate and apply a set of antenna weights in the receiver in order to maximize the "Signal to Interference plus Noise Ratio" (SINR) of an incoming signal.

SUMMARY

This disclosure provides signaling to support advanced wireless receivers and related devices and methods.

In a first embodiment, a method includes receiving an input signal at a user equipment. The input signal includes a desired signal and an interfering signal, where the desired signal defines symbols using constellations. The method also includes obtaining information identifying a wireless channel used by the interfering signal and a modulation type used to modulate data in the interfering signal. The method further includes recovering the symbols from the desired signal using the information.

In a second embodiment, an apparatus includes at least one receiver configured to receive an input signal. The input signal includes a desired signal and an interfering signal, and the desired signal defines symbols using constellations. The apparatus also includes at least one processing unit configured to obtain information identifying a wireless channel used by the interfering signal and a modulation type used to modulate data in the interfering signal and recover the symbols from the desired signal using the information.

In a third embodiment, a method includes identifying information associated with a wireless channel. The wireless channel carries an interfering signal defining symbols using constellations, and the interfering signal interferes with receipt of a desired signal at a user equipment. The method also includes transmitting the information to the user equipment for use in reducing interference at the user equipment. The information identifies the wireless channel and a modulation type used to modulate data in the interfering signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
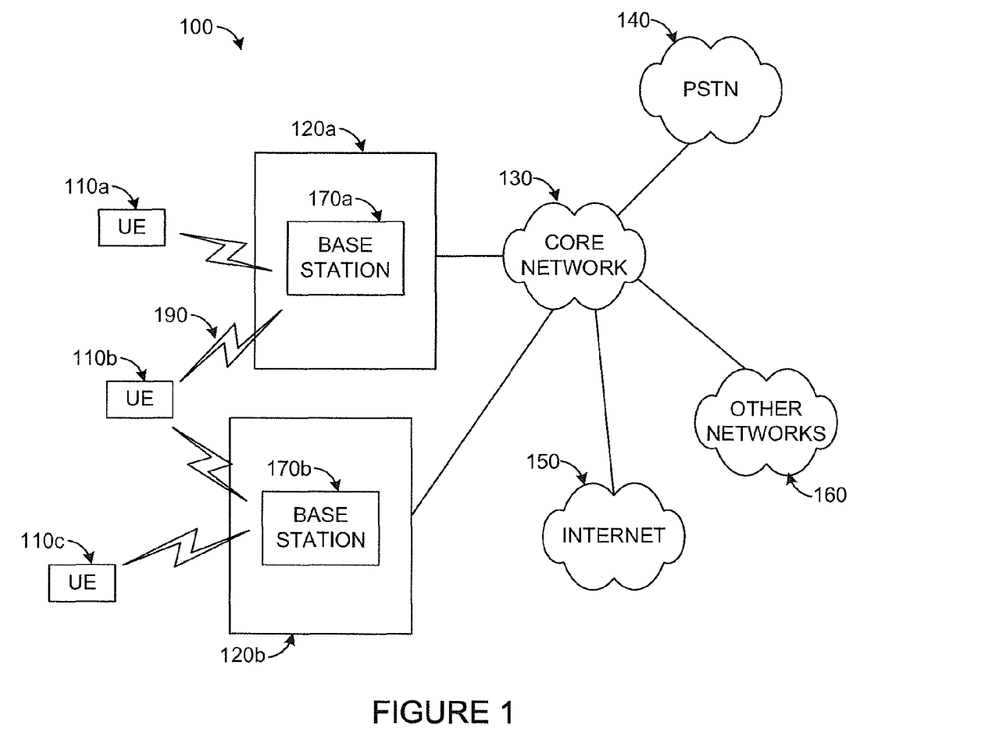
FIG. 1 illustrates an example communication system that uses signaling to support advanced wireless receivers according to this disclosure.

FIG. 1 illustrates an example communication system 100 that uses signaling to support advanced wireless receivers according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LIE, LTE-A, and/or LIE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

As described above, advanced receivers using Interference Rejection Combining (IRC) are very effective at combating interference. However, if the signal constellation of an interfering signal (called an "interferer") is known, other types of receivers such as successive interference cancellation receivers can actually achieve better performance than IRC receivers. Constellations are used with digital modulation schemes, such as quadrature amplitude modulation (QAM) or phase shift keying (PSK). A transmitted symbol is represented as a complex number, and cosine and sine carrier signals are modulated with the real and imaginary parts of the complex number. The symbol can then be sent with two carriers on the same frequency.

In accordance with this disclosure, in conjunction with the use of constellations, the base stations 170a-170b (or other devices) provide signaling to support advanced receivers in the UEs 110a-110c (or other devices). Without this signaling, the advanced receivers may have no information about the source(s) of interference, so little can be done to reduce or eliminate this interference other than assume that the interference is additive Gaussian white noise (AGWN). However, with the information from the signaling, the advanced receivers are able to more effectively identify the source(s) of interference and reduce or eliminate that interference. With the information contained in the signaling, for example, the advanced receivers could achieve very good performance, such as near maximum likelihood (ML) receiver performance. The advanced receivers are therefore able to more effectively reduce or eliminate interference in their incoming signals. Additional details regarding this functionality are provided below.

Although FIG. 1 illustrates one example of a communication system 100 that uses signaling to support advanced wireless receivers, various changes may be made to FIG. 1. For example, the communication system 100 could include any number of UEs, base stations, networks, or other components in any suitable configuration. Also, the signaling and the advanced receivers that use this signaling can be used in any other suitable system.

Figure 2A:
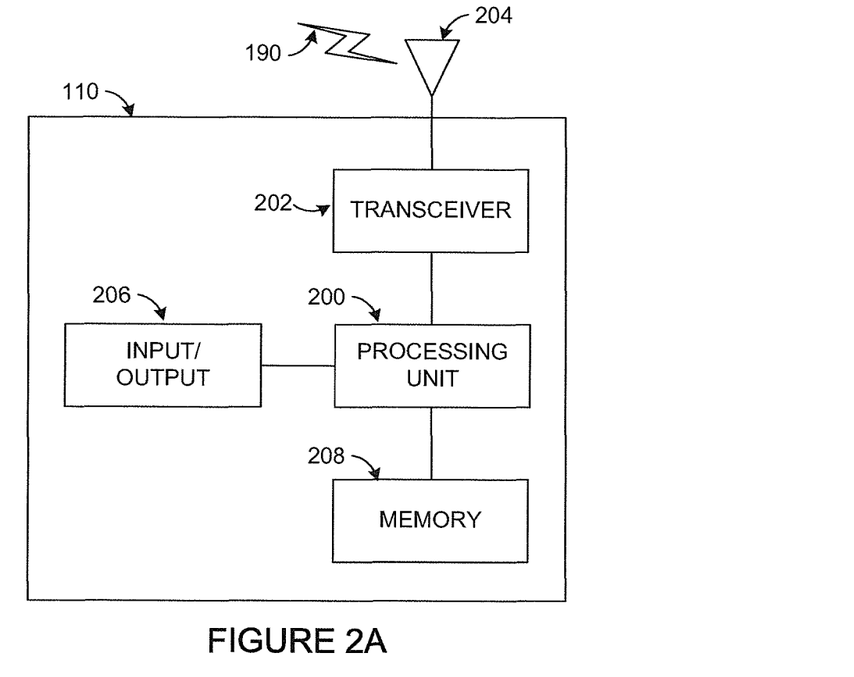
FIGS. 2A and 2B illustrate example devices that use signaling to support advanced wireless receivers according to this disclosure.
Figure 2B:
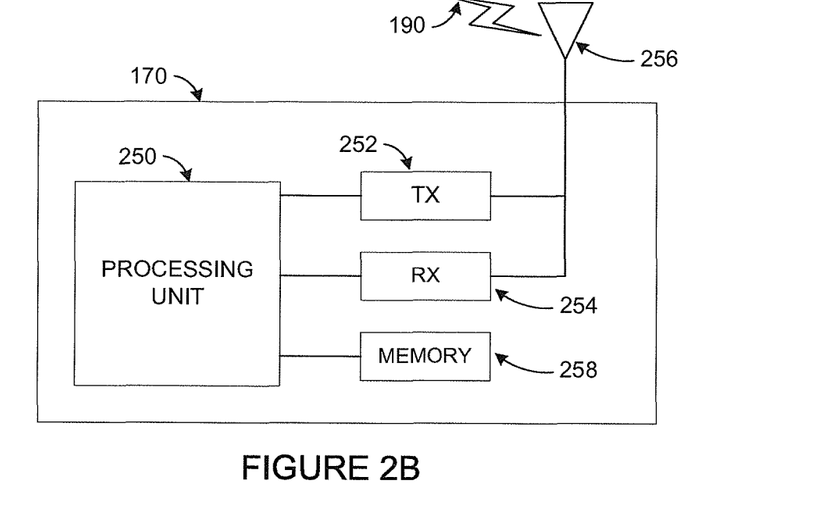

FIGS. 2A and 2B illustrate example devices that use signaling to support advanced wireless receivers according to this disclosure. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the receipt and use of signaling as described in more detail below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the generation of signaling as described in more detail below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

As described above, the base station 170 can support signaling that allows an advanced receiver in the UE 110 (such as in the transceiver 202) to more effectively reduce or eliminate interference. In some embodiments, very little additional information is needed by the advanced receiver. For instance, the advanced receiver may require only two pieces of information beyond what is normally used by an IRC receiver, namely (i) the effective channel of interference/the direction that interfering symbols (such as pilot symbols) are coming from with respect to the UE and (ii) the type of symbols in that channel/the constellation of the interference. The first piece of information could take various forms, such as a Precoding Matrix Indicator (PMI) or a demodulation reference signal (DMRS) sequence. The signaling therefore provides the UE 110 with the information needed by the advanced receiver to effectively reduce or eliminate interference in the UE's received signal. Examples of this type of signaling are described below with respect to FIGS. 3 through 6.

Although FIGS. 2A and 2B illustrate examples of devices that use signaling to support advanced wireless receivers, various changes may be made to FIGS. 2A and 2B. For example, each device 200, 250 could include any other or additional components according to particular needs. Also, the signaling can be generated by any other suitable device or system, and the advanced receiver can be used in any other suitable device or system.

Figure 3A:
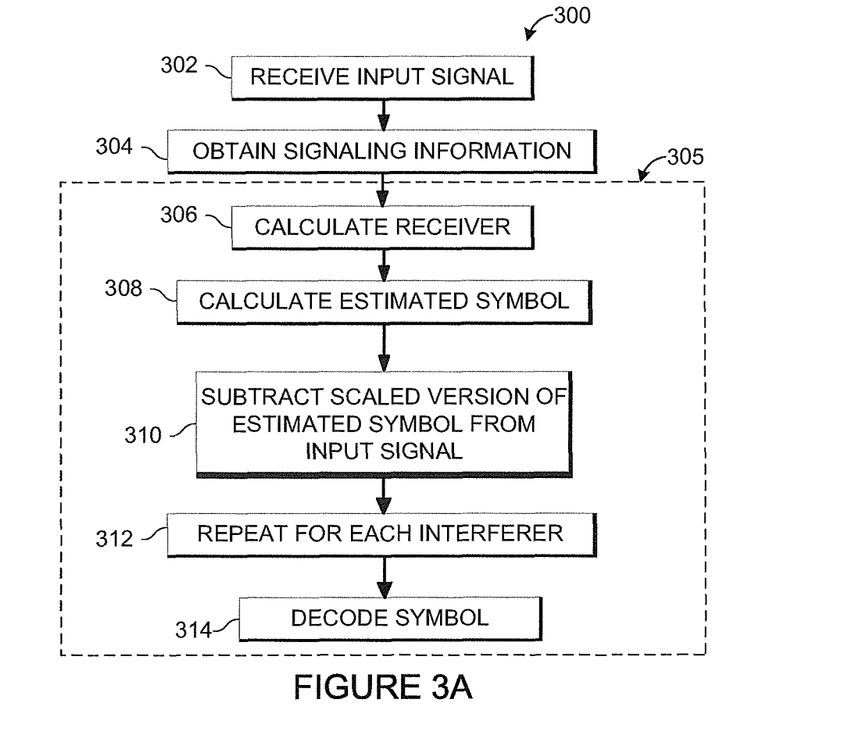
FIGS. 3A and 3B illustrate example methods that use signaling to support an advanced wireless receiver according to this disclosure.
Figure 3B:
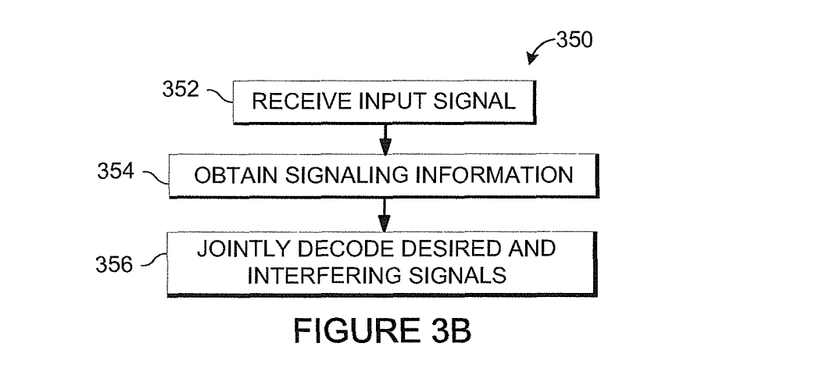

FIGS. 3A and 3B illustrate example methods 300 and 350 that use signaling to support an advanced wireless receiver according to this disclosure. In some embodiments, the method 300 or 350 could be performed by a UE 110 to support more effective reduction of interference.

As shown in FIG. 3A, the method 300 is used for removing interference from an input signal. The input signal is received at step 302. This could include, for example, a UE 110 receiving wireless signals, including at least one desired wireless signal transmitted by a base station. The input signal could represent a multi-dimensional input signal, meaning the input signal is a collection of multiple wireless signals. In particular embodiments, an input signal y can be defined as:

$$y = H_1 x_1 + H_2 x_2 + n \quad (1)$$

where $x_1$ and $x_2$ represent different received wireless signals, $H_1$ and $H_2$ represent different channel gains, and n represents noise. Here, $H_1 x_1$ may represent the desired wireless signal to be received, while $H_2 x_2$ may represent an interfering signal or interferer. Note that an input signal could include one or multiple interferers.

Signaling information is obtained at step 304. As noted above, the signaling information can include (i) the effective channel of interference/the direction that interfering symbols are coming from and (ii) the type of symbols in that channel/the constellation of the interference. Note that the signaling information can be obtained in any suitable manner. As described below, for instance, the signaling information can be explicitly received from a base station or other device, or the signaling information can be deduced using information from a base station or other device.

Interference is removed from the input signal at step 305. Step 305 generally includes any suitable interference reduction or removal technique that operates using knowledge of the symbols contained in at least one interferer. In the example shown in FIG. 3A, the interference reduction or removal technique uses successive interference cancellation.

A receiver is calculated to decode the interferer at step 306. This could include, for example, the UE 110 calculating the receiver r as:

$$r = H_2^H (H_2 H_2^H + H_1^H + R)^{-1} \quad (2)$$

where $H_x^H$ denotes the Hermitian conjugate of $H_x$ and R represents a covariance matrix. Here, knowledge of which channel or channels contain an interferer or interferers and information about the channel(s) was received in the signaling information and is used in this step.

An estimated symbol in the receiver r is calculated at step 308. This could include, for example, the UE 110 calculating the estimated symbol $\hat{s}$ as:

$$\hat{s} = \arg\min \|ry - s\|^2 \quad (3)$$

This could also include the UE 110 calculating the estimated symbol $\hat{s}$ as:

$$\hat{s} = E\{s|y\} \quad (4)$$

where E{ } is a likelihood function. More generally, the UE 110 could calculate the estimated symbol $\hat{s}$ as:

$$\hat{s} = f(y) \quad (5)$$

where the estimated symbol $\hat{s}$ is calculated as a function of y. The estimated symbol $\hat{s}$ represents the symbol that is estimated to have been contained in the interferer.

A scaled version of the estimated symbol is removed from the input signal at step 310. This could include, for example, the UE 110 performing the following calculation:

$$\hat{y} = y - c H_2 \hat{s} \quad (6)$$

where $\hat{y}$ denotes a modified input signal and c denotes a scaling value. The scaling value c can be determined in any suitable manner, such as by accessing a lookup table in the memory 208 using the SINR of the interference. The end result here is that a first interferer is decoded and can be effectively reduced or removed from the input signal.

If necessary, this can be repeated in step 312 for each interferer (note that step 304 may or may not be included in each iteration). Once completed for all interferers, a final symbol is decoded from the input signal at step 314. This could include, for example, the UE 110 using the final value of $\hat{y}$ to decode a symbol from the desired signal.

As shown in FIG. 3B, the method 350 uses a more generic implementation of the interference reduction process. Here, an input signal is received at step 352, and signaling information is obtained at step 354. These steps could be the same as or similar to the steps 302-304 in FIG. 3A.

Desired and interfering signals are jointly decoded at step 356. This could include, for example, the UE 110 using any suitable joint decoding technique to decode the desired and interfering signals. One example joint decoding technique is shown in FIG. 3A, although other techniques (such as iterative decoding) could be used. The UE 110 here can jointly decode the signals using the signaling information obtained earlier. With that information, improved interference rejection can be obtained.

The amount of interference that is removed by the above processes can be significant. By incorporating knowledge of the type of symbols (such as QPSK, 16 QAM, etc.) used in an interfering signal along with the direction that interfering symbols are coming from (such as pilot signals), interference can be removed more effectively compared to conventional approaches.

Although FIGS. 3A and 3B illustrate examples of methods 300, 350 that use signaling to support an advanced wireless receiver, various changes may be made to FIGS. 3A and 3B. For example, while shown as a series of steps, various steps in each figure could overlap, occur in parallel, occur in a different order, or occur multiple times. As a particular example, information about one or multiple interferers could be obtained prior to step 302, 352. Also, while described as being performed by a UE 110, the method 300 or 350 could be performed by any other device in a wireless communication system.

Figure 4:
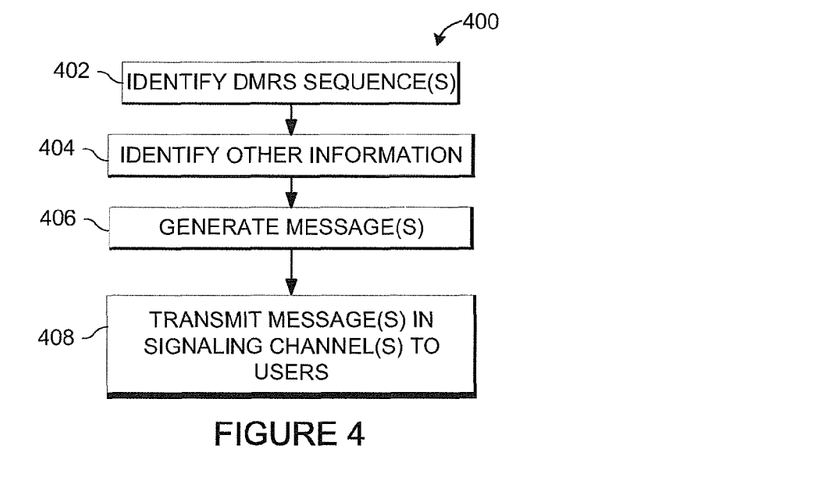
FIGS. 4 through 6 illustrate example methods that generate signaling to support advanced wireless receivers according to this disclosure.
Figure 5:
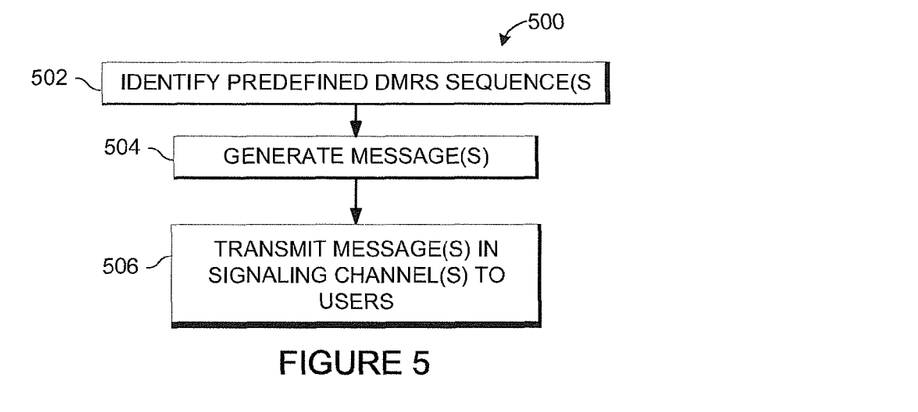
Figure 6:
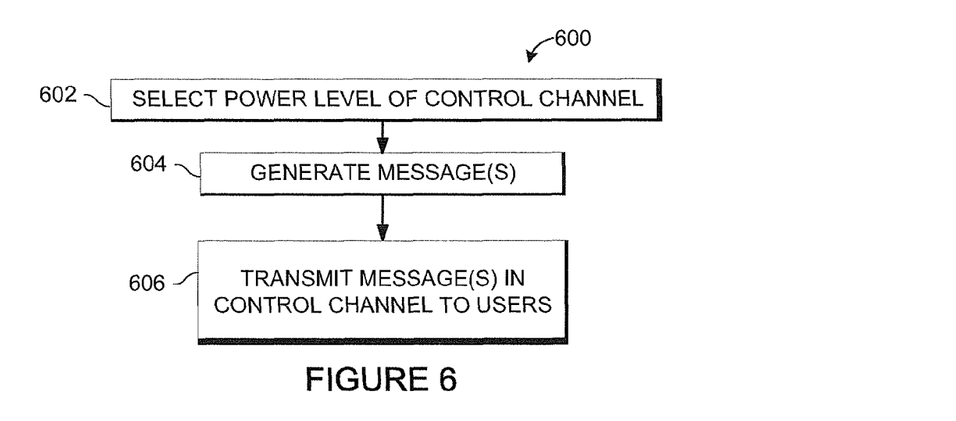

FIGS. 4 through 6 illustrate example methods that generate signaling to support advanced wireless receivers according to this disclosure. In some embodiments, the methods here could be performed by a base station 170 to support more effective reduction of interference at one or more UEs 110.

As noted in FIGS. 3A and 3B, a UE 110 or other device obtains signaling information for reducing interference in some manner. FIG. 4 illustrates an example method 400 in which the signaling information is explicitly provided. As shown in FIG. 4, one or more demodulation reference signal (DMRS) sequences are identified at step 402. This could include, for example, a base station 170 identifying a DMRS sequence or sequences used in each resource (such as each Resource Block or Radio Bearer Group). Other information related to wireless communications with UEs can also be identified at step 404. This could include, for example, the base station 170 identifying sequences and locations of nearby pilot patterns.

One or more messages containing this information are generated at step 406 and transmitted to UEs at step 408. This information can be provided in any suitable manner, such as in a bitmap or an explicit identification of the sequences. Moreover, the information could be contained in broadcast messages or unicast traffic sent to one or more specific UEs over one or more specific channels. Further, the information may be static or dynamic in nature. For instance, the sequences may be constant over a long period of time, or the sequences could be changing rapidly. In addition, this information could be sent by a base station in a "serving" cell that is providing service to a UE or by a base station in an "interfering" cell that is creating interference.

Note that not all of this information needs to be provided to a UE in order to achieve improved interference reduction. Another option is for the signaling to indicate only a portion of the information, and the receiving UE can deduce any necessary additional information. For example, the UE could support blind detection (such as by using power detection or CRC checking) to identify the remainder of the needed information. As a particular example, an evolved NodeB (LTE base station) could indicate a number of layers and their locations but allow one of a limited number of sequences to be used, so the exact sequence used can be easily identified by a UE. As another particular example, the modulation type could be estimated blindly while the sequences are explicitly indicated.

Another option is for the UE 110 to read control information from an actual interfering signal. If the control information is not scrambled, this can often be done relatively easily. The control information could contain the sequence and the modulation of the interferer. Additional information such as Forward Error Correction (FEC) could also be read for this purpose.

FIG. 5 illustrates an example method 500 in which the signaling information is predefined in a standard or using some other mechanism. As shown in FIG. 5, one or more predefined DMRS sequences are identified at step 502. One or more messages containing this information are generated at step 504 and transmitted to UEs using the predefined DMRS sequence(s) at step 506. Here, the sequences can be dictated or defined in a predictable manner by a standard. Assuming the sequences are known ahead of time by a UE 110, the UE 110 can easily detect the sequences, such as by using a simple power detector or correlator. In particular embodiments, any Quadrature Amplitude Modulation (QAM) levels could be explicitly signaled, and the specific sequence used could be tied to which QAM is assigned. Thus, the QAM level would be found at the same time that the channel is detected.

FIG. 6 illustrates an example method 600 in which the signaling information is provided on an LIE or other similar control channel. On an LTE control channel, the precoding style is fixed as a function of the number of transmit ports, meaning the control channel uses Space-Frequency Block Code (SFBC) like precoding. Also, the control channel uses Quadrature Phase Shift Keying (QPSK) modulation. The downside is that because QPSK is used, the power level transmitted does not have to be constant.

The power level of the control channel is therefore selected at step 602. This can be done in several ways. First, the power level on the control channel can be fixed to some known state, essentially locking the power for different Control Channel Elements (CCEs) or parts thereof. These states could then be broadcast or locked in. Second, the power levels used can be constrained to be a selection of a small number of options in a limited range, such as −3 dB to +3 dB. A UE 110 could then blindly decode one of those levels. In particular embodiments, a power level can be blindly estimated using four Resource Elements (the smallest unit of transmission in LTE in both uplink and downlink) to average over. A combination of these approaches can also be used.

One or more messages are generated at step 604 and transmitted to UEs over the control channel at step 606. These messages can contain any suitable information, such as the information described above.

In some embodiments, the information provided here could be transmitted over at least one control channel dedicated to providing this type of information or over at least one control channel that provides this and other types of information. A control channel could use any suitable message format(s) and any suitable signaling message(s) for providing this information to UEs 110 or other devices.

In this way, various techniques can be used to provide the necessary signaling information to a UE for use in reducing or eliminating interference. Note that the use of DMRS sequences are optional here and that other information could be used. For example, a Precoding Matrix Indicator (PMI) could be provided by a base station 170 to a UE 110. In this approach, a channel matrix H can be estimated using a common reference signal (CRS), so the effective channel is H×P (where P is a precoder).

Although FIGS. 4 through 6 illustrate examples of methods that generate signaling to support advanced wireless receivers, various changes may be made to FIG. 4 through 6. For example, while shown as a series of steps, various steps in each figure could overlap, occur in parallel, occur in a different order, or occur multiple times. Also, while described as being performed by a base station 110, the methods 400-600 could be performed by any other device in a wireless communication system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    at least one receiver configured to receive an input signal, the input signal comprising a desired signal transmitted from a base station and an interfering signal, the desired signal defining symbols using constellations and the interfering signal defining symbols using constellations; and
    at least one processing unit configured to:
        receive a Precoding Matrix Indicator (PMI) or a predefined demodulation reference signal (DMRS) sequence of the interfering signal, the PMI or DMRS being transmitted by the base station, and
        blindly determine additional information including a type of symbol used in the interfering signal, wherein parameters associated with the additional information are stored in a memory coupled to the processing unit prior to receipt of the input signal, and
        jointly decode the symbols in the desired signal and the interfering signal using only the PMI or DMRS, and the additional information.

2. The apparatus of claim 1, wherein the at least one processing unit is configured to receive the "PMI or DMRS" using wireless signals received by the at least one receiver from one or more of: a serving base station providing service to the apparatus and an interfering base station interfering with the apparatus.

3. A method comprising:
    receiving an input signal at a user equipment, the input signal comprising a desired signal transmitted from a base station and an interfering signal, the desired signal defining symbols using constellations;
    receiving, at the user equipment, a Precoding Matrix Indicator (PMI) or a predefined demodulation reference signal (DMRS) sequence of the interfering signal, the PMI or DMRS being transmitted by the base station;
    blindly determining, by the user equipment, additional information including a modulation type used to modulate data in the interfering signal, wherein parameters that enable the user equipment to determine the modulation type are stored in a memory in the user equipment prior to receipt of the input signal;
    removing, at the user equipment, at least a portion of the interfering signal from the input signal using only the PMI or DMRS, and the additional information to generate a modified input signal, wherein said removing comprises:
        calculating a receiver value to decode the interfering signal,
        calculating an estimated symbol using the receiver value, and
        subtracting a scaled version of the estimated symbol from the input signal to generate the modified input signal; and
    recovering the symbols from the modified input signal.

4. The method of claim 3, wherein the scaled version of the estimated symbol is identified using a scaling factor retrieved from a lookup table, the lookup table accessed using a Signal to Interference plus Noise Ratio of the interfering signal.

5. An apparatus comprising:
    at least one receiver configured to receive an input signal, the input signal comprising a desired signal transmitted from a base station and an interfering signal, the desired signal defining symbols using constellations; and
    at least one processing unit configured to:
        receive a Precoding Matrix Indicator (PMI) or a predefined demodulation reference signal (DMRS) sequence of the interfering signal, the PMI or DMRS being transmitted by the base station,
        blindly determine additional information including a type of symbol used in the interfering signal, wherein parameters associated with the additional information are stored in a memory coupled to the processing unit prior to receipt of the input signal, and
        remove at least a portion of the interfering signal from the input signal using only the PMI or DMRS, and the additional information to generate a modified input signal, wherein to remove comprises:
            calculate a receiver value to decode the interfering signal,
            calculate an estimated symbol using the receiver value, and
            subtract a scaled version of the estimated symbol from the input signal to generate the modified input signal, and
        recover the symbols from the modified input signal.

6. The apparatus of claim 1, wherein the PMI or DMRS indicates a direction that an interfering symbol comes from.

7. The apparatus of claim 1, wherein the at least one processing unit is configured to determine the additional information using power detection or cyclic redundancy checking.

8. The apparatus of claim 1, wherein the at least one processing unit is configured to determine the additional information by reading control information from the interfering signal.

9. The apparatus of claim 1, wherein the PMI or DMRS is predefined in a standard, and wherein the at least one processing unit is configured to determine the additional information by using a power detector or a correlator.

10. The apparatus of claim 1, wherein the at least one processing unit is configured to determine the additional information by reading forward error correction information from the interfering signal.

11. The apparatus of claim 1, wherein the interfering signal comprises a control channel that is compliant with a Long-Term-Evolution (LTE) standard for wireless communication and that has modulation and precoding schemes that are defined by the LTE standard.

12. The apparatus of claim 11, wherein the control channel is one of a physical broadcast channel (PBCH) and a Physical Downlink Control Channel (PDCCH).

13. The method of claim 3, wherein the PMI or DMRS indicates a direction that an interfering symbol comes from.

14. The method of claim 3, further comprising determining the additional information by reading control information from the interfering signal.

15. The method of claim 3, wherein the PMI or DMRS is predefined in a standard, and further comprising determining the additional information by using a power detector or a correlator.

16. The method of claim 3, further comprising determining the additional information by reading forward error correction information from the interfering signal.

17. The method of claim 3, wherein the interfering signal comprises a control channel that is compliant with a Long-Term-Evolution (LTE) standard for wireless communication and that has modulation and precoding schemes that are defined by the LTE standard.

18. The apparatus of claim 5, wherein the interfering signal comprises a control channel that is compliant with a Long-Term-Evolution (LTE) standard for wireless communication and that has modulation and precoding schemes that are defined by the LTE standard.

* * * * *